United States Patent [19]
Wagner

[11] Patent Number: 5,874,171
[45] Date of Patent: *Feb. 23, 1999

[54] COMPOSITIONS AND ASSEMBLIES OF HIGH-MELTING PERFLUOROPLASTIC MATERIALS

[75] Inventor: Martin Gerald Wagner, Wilmington, Del.

[73] Assignee: E. I. duPont de Nemours and Company, Wilmington, Del.

[*] Notice: The term of this patent shall not extend beyond the expiration date of Pat. No. 5,518,563.

[21] Appl. No.: 694,898

[22] Filed: Aug. 9, 1996

[51] Int. Cl.$^6$ .............................. B32B 7/10; B32B 27/08; B32B 31/12; B32B 31/20
[52] U.S. Cl. ............................ 428/422; 428/421; 156/83; 156/297; 156/306.6; 156/308.6; 156/309.3; 156/333
[58] Field of Search ...................................... 428/421, 422; 156/83, 306.6, 333, 297, 308.6, 309.3; 427/532, 207.1, 299, 301, 302, 307, 322, 372.2

[56] References Cited

U.S. PATENT DOCUMENTS

| 3,513,064 | 5/1970 | Westley et al. | 161/92 |
| 5,168,107 | 12/1992 | Tannenbaum | 524/514 |
| 5,237,049 | 8/1993 | Cavanaugh et al. | 528/491 |
| 5,328,946 | 7/1994 | Tuminello et al. | 524/462 |
| 5,518,563 | 5/1996 | Wagner et al. | 156/83 |

FOREIGN PATENT DOCUMENTS

| 5/78497 | 3/1993 | Japan . |
| 6/57078 | 3/1994 | Japan . |
| WO 92/10549 | 6/1992 | WIPO . |
| WO 93/05100 | 3/1993 | WIPO . |
| WO 94/05498 | 3/1994 | WIPO . |

*Primary Examiner*—Vivian Chen

[57] ABSTRACT

A composition comprising a high-melting perfluoroplastic swollen at a swelling temperature to the extent of at least one percent with a solution of a second, lower-melting perfluoropolymer in a solvent; and an assembly made by contacting said swollen perfluoroplastic material with a surface of an interlayer at a first temperature, contacting another surface of the interlayer with a substrate and applying pressure to cause the interlayer to adhere to both the perfluoroplastic and the substrate and thus form an assembly, and heating the assembly to a second temperature.

17 Claims, No Drawings

COMPOSITIONS AND ASSEMBLIES OF HIGH-MELTING PERFLUOROPLASTIC MATERIALS

FIELD OF THE INVENTION

A high-melting perfluoroplastic material is adhered to the same or to another material by a process which employs a lower-melting perfluoropolymer as an "adhesion aid". Certain novel compositions and assemblies are produced during this process.

TECHNICAL BACKGROUND

Perfluoropolymer materials, in general, are chemically inert and have low surface energies, making them difficult to adhere either to a substrate of the same material or to a substrate of a different material. If the perfluoropolymers comprising these materials also happen to have high melting points, the problem may be even more difficult for reasons referred to below.

In order to improve the adhesion of a high-melting perfluoroplastic, its surface is sometimes chemically modified to introduce functional groups which promote adhesion. Alternatively, the perfluoroplastic may be heated above its high melting point. Especially when high-melting temperatures are involved, however, such processes may be expensive and may lead to undesirable changes in the surface properties of these polymers or to distortion and/or decomposition of the polymer.

Solvents for these polymers have also been used to aid in the process of adhesion, but there are relatively few solvents available for such polymers. Improvements to earlier adhesion processes have been obtained. See, for instance, U.S. Pat. No. 5,237,049. Nevertheless, an improved process that would provide even better adhesion would be highly desirable.

SUMMARY OF THE INVENTION

This invention is directed to a process for adhering a surface of a perfluoroplastic material to a surface of a substrate, comprising:

(a) at a first temperature, contacting the surface of the perfluoroplastic material, which material comprises a first perfluoropolymer, with a solution which comprises a second perfluoropolymer dissolved in a solvent, whereby said perfluoroplastic material swells at least one percent by weight;

(b) optionally removing at least a portion of said solvent from the perfluoroplastic material swollen in step (a);

(c) contacting the surface of said perfluoroplastic material with a first surface of an interlayer which is comprised of the same second perfluoropolymer; contacting a second surface of the interlayer with a surface of said substrate; and applying sufficient pressure to ensure contact between the surface of said perfluoroplastic material and the first surface of said interlayer and between the second surface of said interlayer and the surface of said substrate, thereby forming an assembly; and (d) heating said assembly to a second temperature; provided that the melting point of said first perfluoropolymer is about 200° C. or more, the melting point of said second perfluoropolymer is at least about 10° C. below the melting point of said first perfluoropolymer, said first temperature is below the melting point of said first perfluoropolymer; and said second temperature is at or above the melting point of said second perfluoropolymer but below the melting point of both the first perfluoropolymer and the substrate.

By the term "the surface" is typically meant the surface involved in the adhering or bonding process, which surface is typically a portion of the entire surface of a material, for example, a substantially flat portion, or even an entire side, of a given material.

This invention also concerns a composition or assembly comprising the product of the above process. The invention is also directed to a perfluoroplastic material, which material is comprised of a first fluoropolymer and which material has been swollen at least one percent by weight, at a swelling temperature, by a solution of a second perfluoropolymer, wherein the solvent comprising the solution optionally has been partially or completely removed, provided that:

(1) the melting point of said first perfluoropolymer is about 200° C. or more;
(2) the melting point of said second perfluoropolymer is at least about 10° C. below the melting point of said first perfluoropolymer; and
(3) the swelling temperature is below the melting point of said first perfluoropolymer.

DETAILS OF THE INVENTION

This invention is directed to the adhesion or bonding of high-melting perfluoropolymers and materials thereof. Such materials are also referred to herein as "perfluoroplastics" or, in the claims, as comprised of a "first perfluoropolymer." These polymers have melting points of about 200° C. or more, preferably about 250° C. or more. Preferred polymers are the homopolymer of tetrafluoroethylene (PTFE) and copolymers of tetrafluoroethylene (TFE). Preferred comonomers for these polymers are perfluoroolefins and perfluoro(alkyl vinyl ethers) containing 1 to 5 carbon atoms in the alkyl group. Especially preferred comonomers are hexafluoropropylene, perfluoro(methyl vinyl ether) and perfluoro(propyl vinyl ether).

Among the substrates to which the perfluoroplastic material can be adhered is a substrate of the same material. In this case, however, both the surface of the perfluoroplastic material and the surface of the substrate to be adhered to, to each other through an interlayer as described in step (c) above, should undergo steps (a) and (b) as described above.

In addition to the first-perfluoropolymer, another perfluoropolymer, termed the "second perfluoropolymer" in the claims, is also employed. In the present process, this second perfluoropolymer will have a lower melting point than the "first perfluoropolymer". The same or similar type of perfluoropolymers are preferred for the second perfluoropolymer as for the first perfluoropolymer. However, the second perfluoropolymer must have a lower melting point than the first perfluoropolymer. Lower melting points for TFE copolymers can usually be obtained by having a higher amount of comonomer (monomer other than TFE) in the copolymer. It is preferred if the melting point of the second perfluoropolymer is at least about 20° C. less than that of the first perfluoropolymer. It is more preferred if the second perfluoropolymer has a melting point at least about 20° C. less, but not more than about 50° C. less, than the first perfluoropolymer. The second perfluoropolymer may be thought of as an "adhesive" or an "adhesion aid" in the process described herein.

The second perfluoropolymer is employed in a solution which swells the perfluoroplastic material comprised of the second perfluoropolymer. The same second perfluoropolymer is employed as, or for comprising, the interlayer material. In regard to both of these uses, the second perfluoropolymer is the "same" perfluoropolymer. By "same" is meant that the second perfluoropolymer used in each "step" is the same or similar in composition and properties. For example, for comprising the solution, a copolymer containing 50 mole percent of monomer A and 50 mole percent of monomer B may be used, while for comprising the interlayer, either the identical 50/50 copolymer may be used or, alternatively, a similar copolymer, containing as much as 60 mole percent A and 40 mole percent B. may be used. Thus, some allowable variation in the composition of the same second perfluoropolymer, within the constraints otherwise described and defined, is envisioned.

Melting points of polymers herein are determined by Differential Scanning Calorimetry (DSC) at a heating rate of 10° C./min, as described in ASTM method D-4591. The peak of the melting endotherm is taken as the melting point.

As indicated above, an "interlayer" comprised of the second perfluoropolymer is employed in the present invention. This interlayer is placed between the previously swollen perfluoroplastic material and the substrate to which it is to be bound. It is most convenient to use a film of the second perfluoropolymer as the interlayer, cut to the desired shape and size of the surfaces to be adhered to one another. It is preferred if the original (before optional swelling) thickness of the interlayer is about 0.01 to about 0.25 mm, more preferably about 0.01 to about 0.1 mm.

The second-perfluoropolymer interlayer may optionally be swollen with a solvent, preferably the same solvent employed to make the second-perfluoropolymer solution employed in step (a). It is preferred if the interlayer is swollen with about 10 to about 50 weight percent of the solvent (see below for calculation of weight percent swell).

The second perfluoropolymer, in step (a) of the process, is present in the form of a solution. The solvent for this solution must not only dissolve the second perfluoropolymer at the temperature of step (a), but must also swell the first-perfluoropolymer material (perfluoroplastic material) at that temperature. Generally speaking, highly halogenated compounds, particularly compounds in which most or all of the halogens are fluorine, are solvents and swelling agents for perfluoropolymers. The higher the melting point of the perfluoropolymer, the higher the temperature needed to swell or dissolve that polymer. One can use somewhat lower-boiling highly-halogenated compounds to swell or dissolve such perfluoropolymers, but to achieve the temperatures desired, it is often necessary to work under higher than atmospheric pressure, i.e., in a pressure vessel. This may be inconvenient and, in such cases, it is preferred to use highly halogenated compounds which have atmospheric-pressure boiling points at or above the temperature of step (a). Such solvents are disclosed in P. Smith, et al., MACROMOLECULES, Vol. 18, pgs. 1222–1228 (1985), and also U.S. Pat. No. 5,328,946, the latter incorporated herein in its entirety.

A particularly preferred solvent which may be employed in the present invention is termed "dimer". By "dimer" is meant a by-product from the reaction of phenanthrene with fluorine in the presence of a $CoF_3$ catalyst, a type of fluorination process known in the art. Such a fluorination is described in British Patent 1,281,822. When phenanthrene is thus fluorinated to perfluorotetradecahydrophenanthrene, a higher boiling fraction is obtained upon fractional distillation of the crude liquid product. This fraction has a boiling point in the range of 280° C. to about 400° C. at atmospheric pressure, typically about 320°–340° C. It has a small amount of olefin and a very small amount of hydrogen in it which can be reduced by postfluorination. It is believed that most of this mixture consists of the general structure

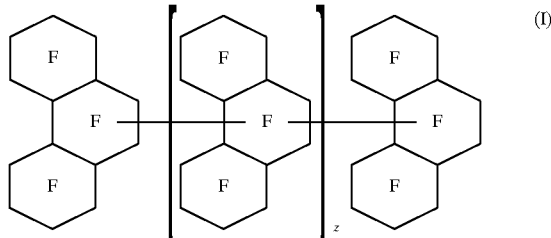

wherein z is 0, 1 or 2. Also believed to be present in smaller quantities are compounds which may be the result of ring fusion and/or ring opening of the above compounds or their precursors, such as

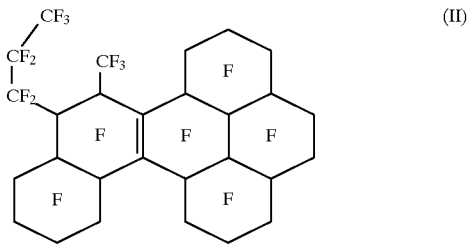

Compound (ii) may be a derivative of a compound of above structure (I) where z is 0. It is not possible to say with assurance, however, that this particular isomer is in the mixture. It is merely illustrative of one possible structure consistent with the analytical data and the synthetic method.

Similar or analogous fused structures, from the compounds where z is 1 or 2, are also believed to be present. This may be inferred from the presence of traces of hydrogen, although the locations of the hydrogen atoms have not been determined.

In the first step of the process, step (a) above, the surface of the perfluoroplastic material to be adhered is swollen with a solution of what has been referred to as the second perfluoropolymer. It is preferred if the solution of the second perfluoropolymer is about 1 to about 15 percent by weight of second perfluoropolymer, more preferably about 3 to about 8 percent by weight. The perfluoroplastic material (which consists, essentially consists, or is comprised of the first perfluoropolymer) should be swollen at least about one percent by weight, preferably at least about 5 percent by weight, more preferably at least about 10 percent by weight, and, in particular, preferably about 5 to about 15 percent by weight. It is only the "surface" to be adhered which need actually be swollen. Thus, for thin-film perfluoroplastic pieces, the weight percent swell (which is taken or measured for the overall perfluoroplastic piece) will often be higher than if a thicker perfluoroplastic piece (perhaps, more accurately, the appropriate near-surface portion of the piece) is swollen with solution.

The weight percent swell can be calculated by measuring the weight of the perfluoroplastic material before ($W_b$) and after ($W_a$) and calculating as follows:

$$\text{weight percent swell} = \frac{W_a - W_b}{W_b} \times 100.$$

After the material comprising the first perfluoropolymer is swollen with a solution of the second perfluoropolymer, the solvent from that solution may optionally be removed from the material. This is usually most conveniently done using heat and/or vacuum. If heating is used, the temperature should be kept below the melting point of the first perfluoropolymer. Some or all of the solvent may be removed.

The composition which is produced by swelling the first perfluoropolymer (whether the solvent is later removed or not) is useful as an "intermediate" in the present adhesion process, i.e., it can be stored, shipped, reshaped as by cutting, etc., and later employed to adhere the perfluoroplastic to a substrate.

The first-perfluoropolymer material after having been swollen with a solution of the second perfluoropolymer, is placed in contact with one surface of a so-called interlayer comprised of the same second perfluoropolymer. Another surface of the interlayer is placed in contact with the substrate to which the first-perfluoropolymer material is to be bound. Sufficient pressure is applied to this assembly to ensure contact between the interlayer surfaces and the surfaces of the first-perfluoropolymer material and the substrate. Heat is then applied at a temperature at or above the melting point of the second perfluoropolymer, but below the melting point of the first perfluoropolymer. It is preferred if this temperature is at least about 20° C. below that of the melting point of the first perfluoropolymer.

Alternatively, an intermediate assembly may be produced which has the first-perfluoropolymer material bonded to an interlayer which is bonded (adhered) only to the first-perfluoropolymer material, by contacting a surface of the interlayer with a surface of the first-perfluoropolymer material which has been swollen, and heating to a temperature at or above the melting point of the second perfluoropolymer but below that of the first perfluoropolymer. Again, it is preferred if this temperature is at least 20° C. below the melting point of the first perfluoropolymer. This composition, in which a second-perfluoropolymer interlayer is bonded to a first-perfluoropolymer material is useful as an "intermediate" in the instant adhesion process. It can be stored, shipped, or cut to size, and then bonded to a substrate by contacting the second-perfluoropolymer interlayer surface with the surface of a substrate, and then heating the assembly at a temperature at or above the melting point of the second perfluoropolymer but below the melting point of the first perfluoropolymer. Again it is preferred if this temperature is at least 20° C. below the melting point of the first perfluoropolymer.

In the Examples, Teflon® PFA fluorocarbon resin (commercially available from E. I. du Pont de Nemour-s and Co., Wilmington, Del., U.S.A.) is a copolymer of TFE and perfluoro(propyl vinyl ether) with a melting point of about 302° C. PTFE has a melting point (second heat) of about 330° C.

COMPARATIVE EXAMPLES A–F AND EXAMPLES 1–3

A 5% solution of Teflon® PFA 350 in a high-boiling fraction of dimer was prepared in a glass flask by stirring at temperatures between 300° and 343° C. The high boiling fraction of the dimer had been previously prepared by distilling off and discarding approximately ⅓ of the original starting material.

Two samples of swollen Teflon PFA film (interlayer) were prepared by swelling the film in liquid dimer for one hour. Sample A was swollen at 225° C., while Sample B was swollen at 250° C. After equilibrating at room temperature, Sample A contained 27.75% solvent by weight, while Sample B contained 31.80% solvent.

Eighteen samples of PFFE approximately 0.5 cm thick by 1.9 cm wide and 10.2 cm long were prepared. Six of these PTFE samples were treated by immersing them in dimer at 320° C. for 15 minutes. Another set of six was treated by immersing them for 15 minutes at 320° C. in the Teflon PFA solution discussed above. The remaining six were used without any further treatment.

Matched pairs of PTFE samples were then assembled with an overlap of approximately 2.5 cm with an interlayer of the swollen film of Sample A, the swollen film of Sample B. and, as a control, no interlayer. These sandwich assemblies were then placed in a C-clamp with stainless steel bearing plates on each side. The bearing plates were approximately 1.9 cm by 3.8 cm and 1.6 mm thick. The clamp was tightened by hand and the entire assembly placed in an oven at 320° C. for one hour. The samples were then removed from the oven, cooled to room temperature and tested by hand for adhesion.

|  | PTFE | Interlayer |
|---|---|---|
| Comparative Examples |  |  |
| A | Untreated | None |
| B | Untreated | PFA-27.8% Solvent |
| C | Untreated | PFA-31.8% Solvent |
| D | Swollen - Solvent Only | None |
| E | Swollen - Solvent Only | PFA-27.8% Solvent |
| F | Swollen - Solvent Only | PFA-31.8% Solvent |
| Examples |  |  |
| 1 | Swollen - PFA Solution | None |
| 2 | Swollen - PFA Solution | PFA-27.8% Solvent |
| 3 | Swollen - PFA Solution | PFA-31.8% Solvent |

Comparative Examples A to F showed very poor adhesion and could easily be pulled apart by hand. Example 1 showed significantly better adhesion, but could still be pulled apart. Examples 1 and 2 showed very strong adhesion. The layers could not be separated by hand. In addition, the stainless steel bearing plates in Examples 2 and 3 strongly adhered to the PTFE samples and only one of the four could be separated by hand. It appeared that some of the swollen PFA film used as an interlayer between the PTFE layers had melted and run in between the steel and the PTFE, thus forming an interlayer between those surfaces.

What is claimed is:

1. A composition, comprising a material comprised of a first perfluoropolymer which has been swollen at least one percent by weight, at a swelling temperature, by a solution of a second perfluoropolymer in a solvent, wherein the solvent has optionally been partially or completely removed from said material, provided that the melting point of the first perfluoropolymer is about 200° C. or more, the melting point of the second perfluoropolymer is at least about 10° C. below the melting point of the first perfluoropolymer, and the swelling temperature is below the melting point of the first perfluoropolymer.

2. The composition of claim 1, wherein the first perfluoropolymer is a homopolymer or copolymer of tetrafluoroethylene, and said second perfluoropolymer is a copolymer of tetrafluoroethylene.

3. The composition of claim 2, wherein the first perfluoropolymer is a homopolymer of tetrafluoroethylene.

4. The composition of claim 2, wherein the comonomers of said copolymer of tetrafluoroethylene are selected from the group consisting of perfluoroolefins monomers, perfluoro(alkyl vinyl ether) monomers, and mixtures thereof, wherein said alkyl contains 1 to 5 carbon atoms.

5. The composition of claim 4, wherein said comonomers are selected from the group consisting of hexafluoropropylene, perfluoro(methyl vinyl ether), perfluoro(propyl vinyl ether), and combinations thereof.

6. The composition of claim 1, wherein the melting point of said first perfluoropolymer is about 250° C. or more.

7. The composition of claim 1, wherein the melting point of said second perfluoropolymer is at least about 20° C., but not more than about 50° C., less than the melting point of said first perfluoropolymer.

8. An assembly comprising the product made by the following process:

(a) at a first temperature, contacting the surface of a perfluoroplastic material comprised of a first perfluoropolymer with a solution of a second perfluoropolymer in a solvent, such that said perfluoroplastic material is made to swell at least one percent by weight, said first temperature being below the melting point of said first perfluoropolymer;

(b) optionally removing some or all of said solvent from the perfluoroplastic material swollen in step (a);

(c) contacting the surface of said perfluoroplastic material with a surface portion or side of an interlayer comprised of the same said second perfluoropolymer, and applying sufficient pressure to ensure contact between the surface of said perfluoroplastic material and the surface portion or side of the interlayer; and (d) heating the product of step (c) to a second temperature to form an assembly of materials, said second temperature being at or above the melting point of said second perfluoropolymer and below the melting point of said first perfluoropolymer;

provided that the melting point of said first perfluoropolymer is about 200° C. or more and the melting point of said second perfluoropolymer is at least about 10° C. below the melting point of said first perfluoropolymer.

9. The assembly of claim 8, wherein the first perfluoropolymer is a homopolymer or copolymer of tetrafluoroethylene, and said second perfluoropolymer is a tetrafluoroethylene copolymer.

10. The assembly of claim 9, wherein the first perfluoropolymer is tetrafluoroethylene homopolymer.

11. The assembly of claim 9, wherein the comonomers of said copolymer of tetrafluoroethylene are selected from the group consisting of perfluoroolefins monomers, perfluoro (alkyl vinyl ether) monomers, and combinations thereof, wherein said alkyl group contains 1 to 5 carbon atoms.

12. The assembly of claim 11, wherein said comonomers are selected from the group consisting of hexafluoropropylene, perfluoro(methyl vinyl ether), perfluoro(propyl vinyl ether) and combinations thereof.

13. The assembly of claim 8, wherein the melting point of said first perfluoropolymer is about 250° C. or more.

14. The assembly of claim 8, wherein the melting point of said second perfluoropolymer is at least about 20° C., but not more than about 50° C., less than the melting point of said first perfluoropolymer.

15. The assembly of claim 8, wherein said interlayer is originally about 0.01 mm to about 0.25 mm thick.

16. The assembly of claim 8, wherein said interlayer is swollen with about 10 to about 50 weight percent of said solvent.

17. A perfluoroplastic-containing assembly which is the product of the following process:

(a) at a first temperature, contacting at least the surface of a perfluoroplastic material comprised of a first perfluoropolymer with a solution of a second perfluoropolymer in a solvent, to cause said perfluoroplastic material to swell at least one percent by weight, said first temperature being below the melting point of said first perfluoropolymer;

(b) optionally removing some or all of said solvent from the perfluoroplastic material swollen in step (a);

(c) contacting the surface of said perfluoroplastic material with a first surface of an interlayer comprised of the same second perfluoropolymer; contacting a second surface of the interlayer with a surface of the substrate; and applying sufficient pressure to ensure contact between the surface of said perfluoroplastic material and the first surface of the interlayer and between the second surface of the interlayer and the surface of said substrate, thereby forming an assembly; and (d) heating said assembly to a second temperature, said second temperature being at or above the melting point of said second perfluoropolymer and below the melting point of said first perfluoropolymer;

provided that the melting point of said first perfluoropolymer is about 200° C. or more and the melting point of said second perfluoropolymer is at least about 10° C. below the melting point of said first perfluoropolymer.

\* \* \* \* \*